United States Patent
Bickham et al.

(10) Patent No.: US 10,107,957 B2
(45) Date of Patent: Oct. 23, 2018

(54) MULTIMODE OPTICAL FIBERS OPERATING OVER AN EXTENDED WAVELENGTH RANGE AND SYSTEM INCORPORATING SUCH

(71) Applicant: Corning Incorporated, Corning, NY (US)

(72) Inventors: Scott Robertson Bickham, Corning, NY (US); Xin Chen, Corning, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 71 days.

(21) Appl. No.: 15/119,992

(22) PCT Filed: Feb. 18, 2015

(86) PCT No.: PCT/US2015/016300
§ 371 (c)(1),
(2) Date: Aug. 18, 2016

(87) PCT Pub. No.: WO2015/126895
PCT Pub. Date: Aug. 27, 2015

(65) Prior Publication Data
US 2017/0068046 A1 Mar. 9, 2017

Related U.S. Application Data

(60) Provisional application No. 61/941,566, filed on Feb. 19, 2014.

(51) Int. Cl.
*G02B 6/02* (2006.01)
*G02B 6/028* (2006.01)
(Continued)

(52) U.S. Cl.
CPC ......... *G02B 6/0288* (2013.01); *G02B 6/0365* (2013.01); *H04B 10/2581* (2013.01);
(Continued)

(58) Field of Classification Search
None
See application file for complete search history.

(56) References Cited

U.S. PATENT DOCUMENTS 5,278,687 A 1/1994 Jannson et al.
7,043,126 B2 5/2006 Guan et al.
(Continued)

FOREIGN PATENT DOCUMENTS

WO 2013003016 A1 1/2013

OTHER PUBLICATIONS

International Search Report and Written Opinion of the International Searching Authority; PCT/US2015/016300; dated May 22, 2015; 12 Pages; European Patent Office.
(Continued)

*Primary Examiner* — Tina Wong
(74) *Attorney, Agent, or Firm* — Svetlana Z. Short

(57) ABSTRACT

According to some embodiments, a multimode optical fiber comprises a graded index glass core with refractive index $\Delta 1$, a maximum refractive index delta $\Delta 1_{MAX}$, and a core radius between 10 and 40 microns; and cladding region surrounding the core comprising refractive index $\Delta 4$, wherein the fiber exhibits an overfilled bandwidth exhibits an overfilled bandwidth of at least 3 GHz-km at a wavelength of 850 nm and an overfilled bandwidth of at least 1.2 GHz-km at one or more wavelengths between 980 and 1060 nm.

19 Claims, 9 Drawing Sheets

(51) Int. Cl.
  *G02B 6/036* (2006.01)
  *H04B 10/2581* (2013.01)
  *H04B 10/50* (2013.01)
  *H04B 10/61* (2013.01)

(52) U.S. Cl.
  CPC ....... *H04B 10/503* (2013.01); *H04B 10/6161* (2013.01); *G02B 6/0281* (2013.01); *G02B 6/03627* (2013.01)

(56) References Cited

U.S. PATENT DOCUMENTS

| | | |
|---|---|---|
| 7,242,870 B2 | 7/2007 | Guan et al. |
| 8,385,702 B2 * | 2/2013 | Bickham ............ G02B 6/03627 385/124 |
| 8,842,957 B2 | 9/2014 | Bickham et al. |
| 8,971,683 B2 * | 3/2015 | Chen .................... G02B 6/0281 385/122 |
| 2010/0021170 A1 | 1/2010 | Lumineau et al. |
| 2013/0003016 A1 * | 1/2013 | Feldon .................... A61B 3/14 351/206 |
| 2013/0039626 A1 | 2/2013 | Bickham et al. |
| 2013/0114934 A1 | 5/2013 | Bookbinder et al. |
| 2014/0318188 A1 | 10/2014 | Bowker et al. |

OTHER PUBLICATIONS

Olshansky, R. "Model of Distortion Losses in Cabled Optical Fibers." Appl. Opt., 14, 20 (1975)].

T. A. Lenahan, "Calculation of Modes in an Optical Fiber Using the Finite Element Method and EISPACK", The Bell System Technical Journal vol. 62 (No. 9), pp. 2663-2695, (1983).

\* cited by examiner

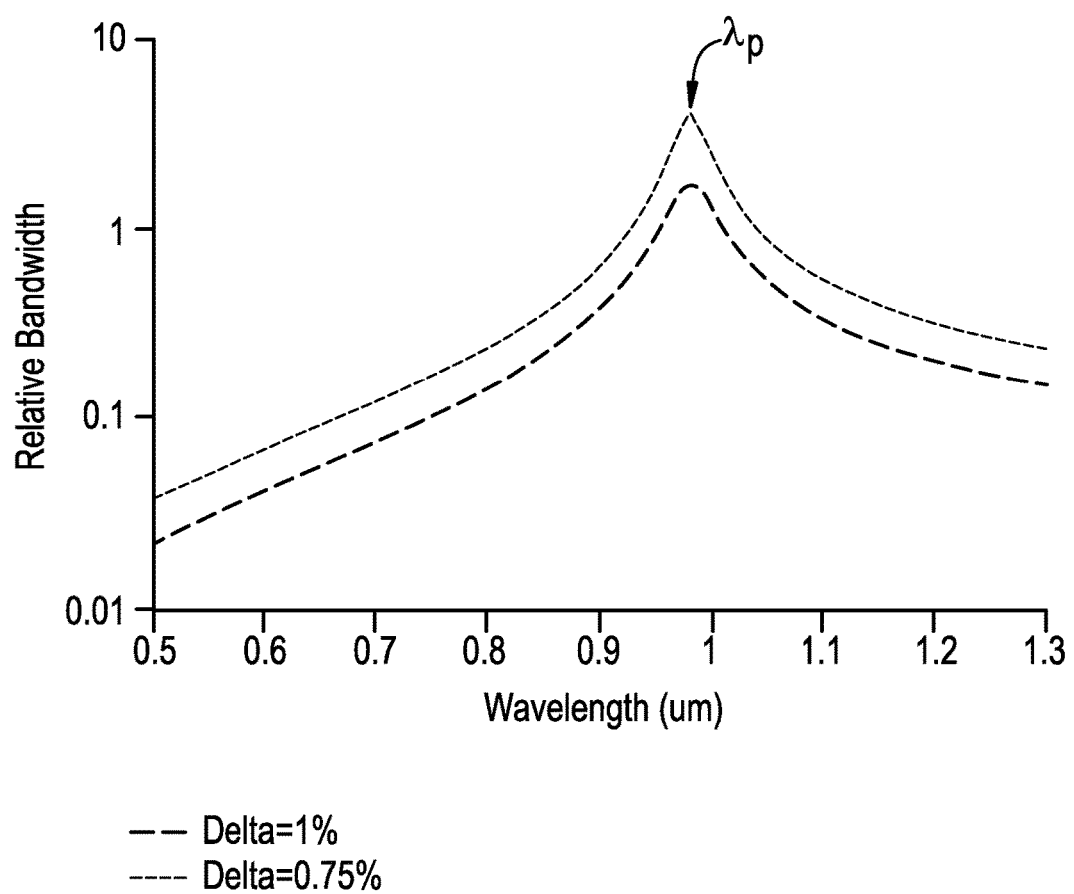

MULTIMODE OPTICAL FIBERS OPERATING OVER AN EXTENDED WAVELENGTH RANGE AND SYSTEM INCORPORATING SUCH

CROSS-REFERENCE TO RELATED APPLICATIONS

This application claims the benefit of priority under 35 U.S.C. § 371 of U.S. international Application Serial No. PCT/US2015316300 filed on Feb. 18, 2015, which claims the benefit of priority to U.S. Provisional Application No. 61/941,566 filed on Feb. 19, 2014, the content of each of which relied upon and incorporated herein by reference in its entirety.

The present invention relates generally to optical fibers, and more specifically to multimode optical fibers and systems incorporating such fibers.

TECHNICAL BACKGROUND

Multimode (MM) fibers that operate at the wavelength range centered around 850 nm are known. The bandwidth (BW) of these multimode (MM) fibers is limited mostly by inter-modal chromatic dispersion. To minimize the inter-modal chromatic dispersion, MM fibers are designed with graded index α-profiles. Current high bandwidth (greater than 1 GHz·Km) optical fibers are optimized for use at 850 nm. Some of these MM fibers also have a second operating window, with much lower BW (<1 GHz·km) centered at 1300 nm.

VCSELs (vertical cavity surface-emitting lasers) being developed for wavelengths greater than 900 nm for high speed operation and their use provide significant advantages over the 850 nm VCSELS. VCSELs that operate above about 900 nm and below 1200 nm are now feasible. While these VCSELs are being proposed for high speed applications in the 900 nm-1200 nm wavelength range, optical fibers that are optimized to operate well in multiple wavelengths so that they can be used with 850 nm VCSELs and also with VCSELs that operate above about 900 nm and below 1200 nm are not available.

Although multimode fibers that are optimized for peak modal bandwidth at a wavelength near 850 nm can transmit at longer wavelengths, they exhibit low bandwidth in the 900 nm-1200 nm range, effectively limiting the system reach when such fibers are utilized with VCSELs being developed for wavelengths greater than 900 nm for high speed operations. On the other hand existing multimode fibers that have high bandwidth in a broad wavelength range are very difficult or impossible to make due to inter-modal chromatic dispersion because of material dispersion limitation.

SUMMARY OF THE INVENTION

According to some embodiments, a multimode optical fiber includes a graded index glass core with refractive index $\Delta 1$, a maximum refractive index delta $\Delta 1_{MAX}$, and a core radius between 11 and 23.75 microns (e.g., 12.5 to 22.5 microns); and cladding region surrounding the core comprising refractive index $\Delta 4$, wherein the fiber has a peak modal bandwidth wavelength $\lambda p > 860$ nm and exhibits an overfilled bandwidth of at least 3 GHz-km at a wavelength of 850 nm, an overfilled bandwidth at one or more wavelengths between 900 nm and 930 nm and an overfilled bandwidth of at least 1.2 GHz-km one or more wavelengths between 980 nm and 1060 nm. In some embodiments the core has an alpha value of $2.05 < \alpha < 2.15$, preferably $2.075 < \alpha < 2.13$, more preferably $2.08 < \alpha < 2.115$, for example $2.08 < \alpha < 2.11$.

According to some embodiments, a multimode optical fiber comprises a graded index glass core with refractive index $\Delta 1$, a maximum refractive index delta $\Delta 1_{MAX}$, and a core diameter of about 22 to 47.5 microns (e.g., 24 to 47 microns, 24 to 46 microns, 24 to 45 microns, 25 to 46 microns, or in some embodiments 25 to 45 microns, or 30 to 45 microns); and cladding region surrounding the core comprising refractive index $\Delta 4$, wherein the fiber exhibits an overfilled bandwidth at a wavelength in the an overfilled bandwidth of at least 3 GHz-km at a wavelength of 850 nm, an overfilled bandwidth of at least 2 GHz-km at a wavelength of 910 nm, and an overfilled bandwidth of at least 1 GHz-km at a wavelength of 1000 nm. In some embodiments the core has an alpha value of $2.05 < \alpha < 2.115$, for example, $2.075 < \alpha < 2.11$, or $2.08 < \alpha < 2.11$. In some embodiments the core NA is in the range of about 0.18 to about 0.22, for example 0.185 to 0.215.

According to some embodiments, a multimode optical fiber comprises a graded index glass core with refractive index $\Delta 1$, a maximum refractive index delta $\Delta 1_{MAX}$, and a core diameter of about of 22 to 47.5 microns (e.g., 24 to 45 microns); and cladding region surrounding the core comprising refractive index $\Delta 4$, wherein the fiber exhibits an overfilled bandwidth of at least 3 GHz-km at a wavelength of 850 nm, an overfilled bandwidth of at least 2 GHz-km at a wavelength of 920 nm, and an overfilled bandwidth of at least 1.2 GHz-km at a wavelength of 1060 nm. In some embodiments the core has an alpha value of $2.075 < \alpha < 2.115$, for example, $2.08 < \alpha < 2.11$.

According to some embodiments a multimode optical fiber comprises:

(i) a graded index glass core comprising refractive index delta 1, said core comprising a core radius between 11 and 23.75 microns; and (ii) a depressed index cladding region surrounding said core and comprising refractive index delta $\Delta 3MIN$; and (iii) an outer cladding comprising refractive index $\Delta 4$. The outer cladding region surrounds the depressed index cladding region. The depressed index cladding region has a refractive index delta less than about −0.1% and a width of at least 1 micron, wherein $\Delta 1 > \Delta 4 > \Delta 3MIN$, and the fiber exhibits an overfilled bandwidth of at least 3 GHz-km at a wavelength of 850 nm, an overfilled bandwidth of at least 2 GHz-km at a wavelength of 910 nm, and an overfilled bandwidth of at least 1.2 GHz-km (and preferably at least 1.5 GHz-km at the 1000 nm) at one or more wavelengths between 980 nm and 1000 nm range.

According to some embodiments a system comprises:

(i) at least one light source (e.g., VCSEL(s), said light source transmits at a bit rate of 16 Gb/s or higher (e.g., 25 Gb/s, 32 Gb/s, 50 Gb/s, or 56 Gb/s) at one or more wavelengths from about 850 nm to about 1100 nm;

(ii) at least one multimode optical fiber optically coupled to the light source, said fiber comprises a graded index a graded index glass core with an alpha (a) value between 2.05 and 2.15 (for example, $2.075 < \alpha < 2.13$, or $2.08 < \alpha < 2.11$), and a cladding comprising an outer cladding portion, wherein said fiber has an overfilled bandwidth of at least 3 GHz-km at a wavelength of 850 nm, an overfilled bandwidth of at least 2 GHz-km at one or more wavelengths between 900 and 930 nm, and an overfilled bandwidth of at least 1.2 GHz-km at one or more wavelengths between 1000 nm and 1060 nm (e.g., at least 1.5 GHz-km at al 000 nm or 1060 nm wavelength).

(iii) a detector optically coupled to the multimode optical fiber and capable of detecting a wavelength between 850 nm and 1100 nm.

Preferably the fiber exhibits: (a) a chromatic dispersion magnitude less than 100 ps/nm/km at 850 nm, less than 60 ps/nm/km at one or more wavelengths situated in the 900 nm to 1060 nm range, and (b) an attenuation less than 1.5 dB/km at one or more wavelengths situated in 900 to 1060 nm range.

According to some embodiments the at least one light source is/are VCSEL(s) that operate(s) in 850 nm to 1060 nm wavelength range.

Some of the advantages for utilizing these optical systems that utilize longer wavelength (>9000 nm) VCSELs include supporting Class 1 eye safety specifications, improved source and detector performance, lower optical fiber attenuation, better photon energy conversion, less VCSEL temperature increase, lower chromatic dispersion, and lower cost. The embodiments of optical fiber disclosed herein are designed operate with both 850 nm sources and the VCSELs operating in at least one wavelength in the 900-1100 nm range.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 2 illustrates bandwidth dependence as a function of core delta for the graded index MM optical fiber of FIG. 1A;

DETAILED DESCRIPTION

Figure 1A:
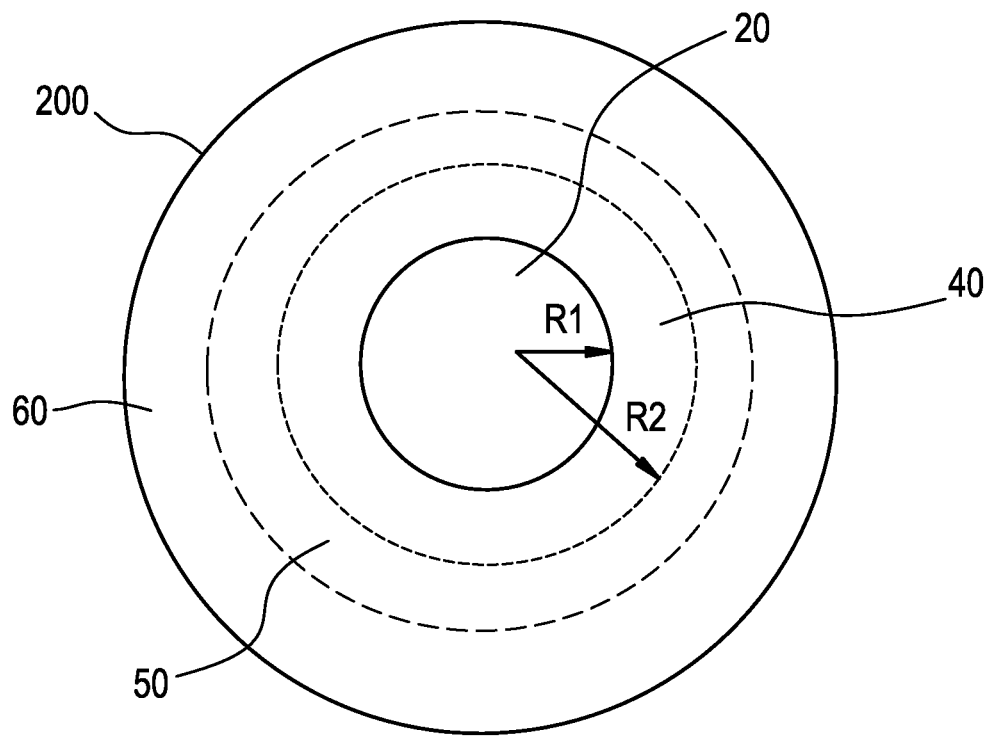
FIG. 1A shows a schematic representation (not to scale) of the a cross-sectional view of the glass portion of an exemplary embodiment of multimode optical fiber.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_{REF}^2)/2n_i^2$, where $n_i$ is the maximum refractive index in region i, unless otherwise specified. The relative refractive index percent is measured at 980 nm unless otherwise specified. Unless otherwise specified herein, $n_{REF}$ is the average refractive index of the outer annular portion 60 of the cladding, which can be calculated, for example, by taking "N" index measurements ($n_{C1}$, $n_{C2}$, ... $n_{CN}$) in the outer annular portion of the cladding, and calculating the average refractive index by:

$$n_C = (1/N)\sum_{i=1}^{i=N} n_{Ci}.$$

As used herein, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants.

Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

Unless otherwise, noted, macrobend performance was determined according to FOTP-62 (IEC-60793-1-47) by wrapping 1 turn around a either a 6 mm, 10 mm, or 20 mm or similar diameter mandrel (e.g. "1×10 mm diameter macrobend loss" or the "1×20 mm diameter macrobend loss") and measuring the increase in attenuation due to the bending using an overfilled launch condition where the optical source has a spot size that is greater than 50% of the core diameter of the fiber under test. In some measurements, an encircled flux launch (EFL) macrobend performance was obtained by launching an overfilled pulse into an input end of a 2 m length of InfiniCor® 50 micron optical fiber which was deployed with a 1×25 mm diameter mandrel near the midpoint. The output end of the InfiniCor® 50 micron optical fiber was spliced to the fiber under test, and the measured bend loss is the ratio of the attenuation under the prescribed bend condition to the attenuation without the bend.

Unless otherwise stated, bandwidth is measured under overfilled launch conditions at the operating wavelength according to IEC 60793-1-41 (TIA-FOTP-204), Measurement Methods and Test Procedures—Bandwidth.

As used herein, numerical aperture of the fiber means numerical aperture as measured using the method set forth in TIA SP3-2839-URV2 FOTP-177 IEC-60793-1-43 titled "Measurement Methods and Test Procedures-Numerical Aperture".

The term "α-profile" or "alpha profile" refers to a relative refractive index profile, expressed in terms of Δ(r) which is in units of "%", where r is radius, which follows the equation, $$\Delta(r)=\Delta(r_o)(1-[|r-r_o|/(r_1-r_o)]^\alpha),$$

where $r_o$ is zero unless otherwise specified, $r_1$ is the point at which Δ(r) % is zero, and r is in the range $r_i \le r \le r_f$, where Δ is defined above, $r_i$ is the initial point of the α-profile, $r_f$ is the final point of the α-profile, and α is an exponent which is a real number.

The microbend sensitivity is compared to that of conventional 50 μm MMF, which has a core radius of 25 μm and a relative refractive index of 1%. The microbending sensitivity of a multimode fiber can be estimated by $$\gamma = N\langle h^2 \rangle \frac{a^4}{b^6 \Delta^3}\left(\frac{E}{E_f}\right)^{3/2}$$

where γ is the microbending induced attenuation increase, N is the number of bumps of average height h per unit length, b is the total fiber diameter, a is the core radius, Δ is the fiber refractive index difference and $E_f$ and E are the elastic moduli of the fiber and the fiber surrounding material (i.e., coating) respectively [Olshansky, R. "Model of Distortion Losses in Cabled Optical Fibers." Appl. Opt., 14, 20 (1975)]. In fibers with the same coating and glass diameter, the microbending sensitivity of a fiber with core radius a (μm) and core delta Δ (%) relative to standard 50 μm MMF is then $$\gamma = \frac{(a/25)^4}{\Delta^3}$$

The microbend sensitivity is preferably less than 10, more preferably less than 5, more preferably less than 2 and still more preferably less than 1. For example, the microbending sensitivity may be less than 0.8, less than 0.6 or less than 0.4.

The depressed-index annular portion has a profile volume, $V_3$, defined herein as:

$$2\int_{R_{INNER}}^{R_{OUTER}} \Delta_3(r)r\,dr$$

where $R_{INNER}$ is the depressed-index annular portion inner radius and $R_{OUTER}$ is the depressed-index annular portion outer radius as defined. For the fibers disclosed herein, the absolute magnitude of $V_3$ is preferably greater than 80%-micron², or greater than 100%-micron², or greater than 125%-micron². In some preferred embodiments, the absolute magnitude of $V_3$ is greater than 100%-micron² and less than 200%-micron. In some embodiments, the absolute magnitude of $V_3$ is greater than 110%-micron² and less than 175%-micron², for example 140%-micron².

Multimode optical fiber disclosed herein comprises a core and a cladding surrounding and directly adjacent the core. In some embodiments, the core comprises silica doped with germanium, i.e., germania doped silica. Dopants other than germanium such as $Al_2O_3$ or $P_2O_5$, singly or in combination, may be employed within the core, and particularly at or near the centerline, of the optical fiber disclosed herein to obtain the desired refractive index and density. In some embodiments, the refractive index profile of the optical fiber disclosed herein is non-negative from the centerline to the outer radius of the core. In some embodiments, the optical fiber contains no index-decreasing dopants in the core.

FIG. 1A is a schematic representation (not to scale) of a cross-sectional view of one embodiment of the MM optical fiber 100. This exemplary embodiment of a multimode optical fiber 100 comprises a glass core 20 and a glass cladding 200. The cladding may comprise an optional inner annular portion 40, an optional depressed-index annular portion 50, and an outer annular portion 60. Preferably, the core 20 comprises silica doped essentially with a single dopant, for example Ge (i.e., the amount of other dopants being less than 0.5 wt %, and preferably less than 0.1 wt %). Preferably, the core 20 comprises silica with a single dopant, for example Ge.

Figure 1B:
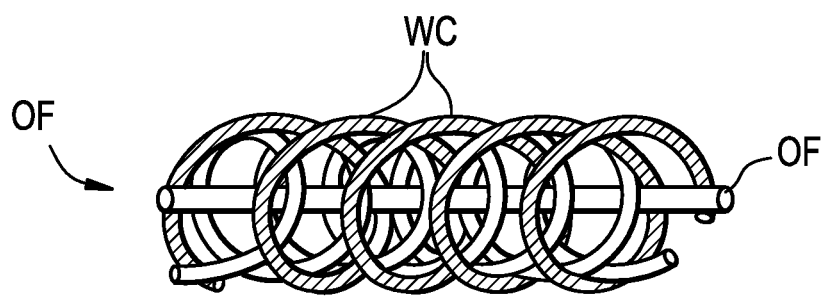
FIG. 1B shows a schematic representation (not to scale) of the refractive index profile of a cross-section of the glass portion of an exemplary embodiment of multimode optical fiber of FIG. 1A.

FIG. 1B illustrates a schematic representation of the refractive index profile of a cross-section of the glass portion of one exemplary embodiment of a multimode optical fiber 100 comprising a glass core 20 and a glass cladding 200, the cladding of this embodiment comprising only an outer annular portion 60. In the embodiment(s) of FIG. 1B, the fiber core 20 has a parabolic shape, the outer radius $R_1$, and maximum refractive index delta $\Delta 1_{MAX}$. The cladding has an outer radius $R_{MAX}$. More specifically, the core delta $\Delta 1_{MAX}$ of FIG. 1A embodiments is between 0.75% and 1.2% (e.g., 0.8%, 0.9%, 0.95%, 1%, 1.1% or therebetween)

In some exemplary embodiments the core radius $R_1$ is 15 μm to 23.75 μm, for example 15 to 22.5 μm. According to some embodiments, the core radius $R_1$ is 17 μm to 22.5 μm and the core NA is 0.18 to 0.22. According to these embodiments the optical fiber 100 has a peak modal bandwidth wavelength λp, where 860 nm≤λp≤930 nm, for example 860 nm≤λp≤900 nm, or 890 nm≤λp≤930 nm. In some embodiments, 860 nm≤λp≤895 nm. In some embodiments, 870 nm≤λp≤920 nm.

It is noted that if the cladding 200 includes optional depressed-index annular portion 50, the fibers 100 can become bend-insensitive. Fiber profiles for such bend insensitive fibers are illustrated, for example, in FIGS. 6, 7A, 7B, 8A, 9A and 10 and are described in more detail further in the specification.

In one exemplary fiber embodiment the fiber is optimized for two operating wavelengths 850 nm and 900 nm. In another embodiment the fiber's design is optimized to provide high modal bandwidth at 850 nm and 930 nm wavelengths. In another exemplary embodiment the fiber is optimized to provide high modal bandwidth at operating wavelengths of 850 nm and 1060 nm, with an overfilled bandwidth of at least 3 GHz-km at a wavelength of 850 nm and an overfilled bandwidth of at least 1.2 GHz-km at one or more wavelengths between 1000 and 1060 nm band. In another exemplary embodiment the fiber is designed to provide high modal bandwidth at three operating wavelengths: 850 nm, 910 nm, and 1060 nm. In another exemplary embodiment the fiber is designed to provide high modal bandwidth at three operating wavelengths: 850 nm, 910 nm, and 1000 nm. In another exemplary embodiment the fiber is designed to provide high modal bandwidth at three operating wavelengths: 850 nm, 910 nm, and 1020 nm.

In all embodiments described herein the optical fiber 100 exhibits an overfilled bandwidth of at least 3 GHz-km at a wavelength of 850 nm, an overfilled bandwidth at least 2 GHz-km at one or more wavelengths between 900 and 930 nm range, and an overfilled bandwidth of at least 1.2 GHz-km at one or more wavelengths between 1000 and 1060 nm. These optical fibers are also designed to be relatively insensitive to small α perturbations, and may also have a small centerline dip in the core's refractive index profile, as described below.

For example, in some embodiments the optical fiber 100 exhibits an overfilled bandwidth of at least 3 GHz-km at a wavelength of 850 nm, an overfilled bandwidth of at least 2 GHz-km at a wavelength of 910 nm, and an overfilled bandwidth of at least 1.2 GHz-km at a wavelength of 1000 nm. In some embodiments the optical fiber 100 exhibits an overfilled bandwidth of at least 3 GHz-km at a wavelength of 850 nm wavelength, an overfilled bandwidth of at least 2 GHz-km at a wavelength of 920 nm, and an overfilled bandwidth of at least 1.2 GHz-km at a wavelength of 1060 nm.

The bandwidth BW of the MM optical fiber 100 is mostly limited by inter-modal dispersion. To minimize the inter-modal dispersion, the refractive index of the core is designed to have a α-profile. The optimum α is described by the following equation:

$$\alpha_{opt} = 2 + p - \Delta \frac{(4+p)(3+p)}{5+2p} \text{ where } p = \frac{2n_1}{N_1} \frac{\lambda}{\Delta} \frac{d\Delta}{d\lambda},$$

$n_1$ is the refractive index in the center, D is the peak relative refractive index change in the center, and $$N_1 = n_1 - \lambda \frac{dn_1}{d\lambda},$$

where λ is 850 nm to 1200 nm. The equation shows that the optimum α depends on the wavelength and the dispersion properties of the core 20.

According to some embodiments described herein optical fibers 100 are optimized for a bandwidth with peak modal bandwidth wavelength λp between 860 nm and 930 nm (e.g., in 900 nm-930 nm range), have core deltas $\Delta 1_{MAX}$ where 0.75%≤$\Delta 1_{MAX}$≤1.2% (for example, 0.9%≤$\Delta 1_{MAX}$≤1.05%) and have alpha values of 2.05≤α≤2.15, for example 2.075≤α≤2.115. Preferably, 2.08≤α≤2.11. We have determined that for optical fibers 100 when 0.9<$\Delta 1_{MAX}$≤1.05% the preferred alpha values are 2.08≤α≤2.11.

The fiber's bandwidth BW is also a function of the core delta. More specifically, the maximum bandwidth BW increases as the maximum core delta $\Delta 1_{MAX}$ decreases. More specifically, FIG. 2 results correspond to two fiber with $\Delta 1_{MAX}$ values of 1% and 0.75%. For example, FIG. 2 illustrates bandwidth dependence as a function of core delta for the graded index MM optical fiber 100 of FIG. 1A. It illustrates that for the bandwidths with peak modal bandwidth wavelength λp situated 900 nm to 1050 nm, optical fibers 100 with lower $\Delta 1_{MAX}$ values produce higher maximum bandwidths.

However, the bend loss of the optical fiber 100 increases with decrease in core delta, and the choice of the core delta can be determined by the optimization of the bandwidth and bend loss consideration. In addition, as discussed above, the optimum α at any operating wavelength is also a function of the core delta.

FIG. 1B illustrates an exemplary modeled refractive index delta profile for one embodiment of optical fiber 100 disclosed herein, This parameters of five exemplary fiber embodiments (fibers 2-6) corresponding to FIG. 1B are shown in Table 1, below. Fiber 1 is a comparative fiber that has λp=850 nm.

Table 1 illustrates modeled fiber parameters and corresponding OFL bandwidth performance of these fibers. The modeling performance data is based on ideal fiber profile. In reality, the actual refractive index delta profile of the drawn always deviates from the ideal alpha profile. Typically at the peak modal bandwidth wavelength, the highest achievable bandwidth is 30-60% of the calculated bandwidth of the ideal fiber for a portion of the fiber distribution.

TABLE 1

|  | Core Delta (%) | Core Diameter (μm) | alpha | λp (nm) | OFL BW at 850 nm (GHz.km) | OFL BW at 1060 nm (GHz.km) |
|---|---|---|---|---|---|---|
| Fiber 1 | 1 | 50 | 2.0949 | 850 | 15.13 | 1.41 |
| Fiber 2 | 1 | 47.5 | 2.086 | 875 | 7.2 | 1.68 |
| Fiber 3 | 1 | 40 | 2.086 | 880 | 4.69 | 1.92 |
| Fiber 4 | 1 | 30 | 2.086 | 890 | 5.18 | 2.19 |
| Fiber 5 | 0.9 | 40 | 2.086 | 885 | 5.57 | 2.4 |
| Fiber 6 | 0.9 | 30 | 2.081 | 900 | 4.2 | 2.7 |

As shown in Table 1, Applicants surprisingly discovered that when the optical fiber 100 was optimized to have a larger λp, by slightly reducing the alpha value (e.g., from 2.095 to 2.086 or less, its performance at 1060 nm was dramatically improved (the Overfilled Launch bandwidth, OFL BW, became larger at 1060 nm) while still being very good at a wavelength of 850 nm. When the core diameter was reduced, the fiber's performance was further improved (higher OFL BW value) at a wavelength of 1060 nm while still being significantly above 3 GHz-km at a wavelength of 850 nm. It is noted that although modeled performance for the optical fiber 1 indicates that this fiber has an OFL bandwidth of 1.41 GHz-km, this is a theoretical value, the actual fiber bandwidth is typically 20 to 25% lower than the theoretical value are and expected to be below the required 1.2 GHz-km at the 1060 nm wavelength.

Figure 3A:
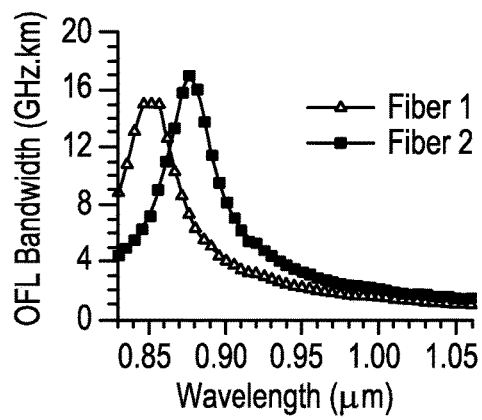
FIGS. 3A and 3B illustrate modeled OFL Bandwidth for fibers 1 ($\lambda p$=850 nm) and fiber 2 ($\lambda p$=875 nm) for wavelengths between 850 nm and 1050 nm.
Figure 3B:
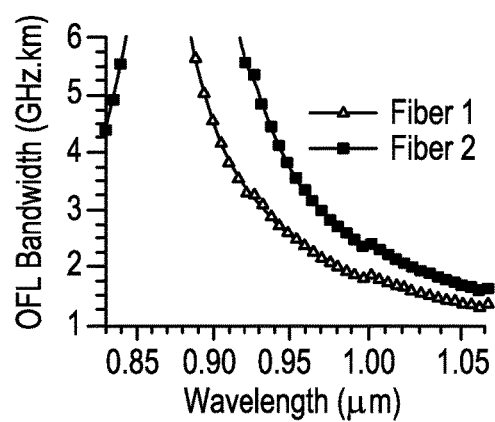
Figure 4A:
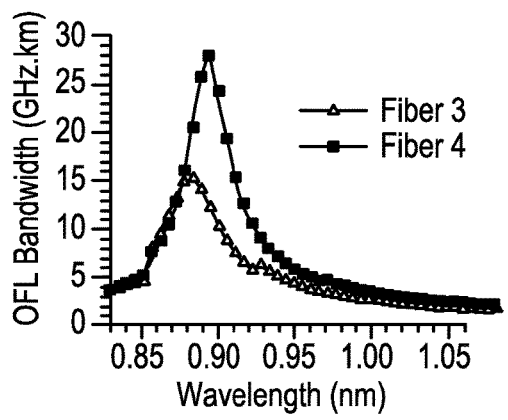
FIGS. 4A and 4B illustrate modeled OFL Bandwidth for two other fiber embodiments (fibers 3 and 4)
Figure 4B:
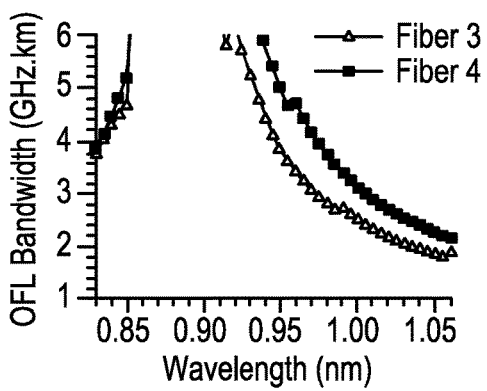
Figure 5A:
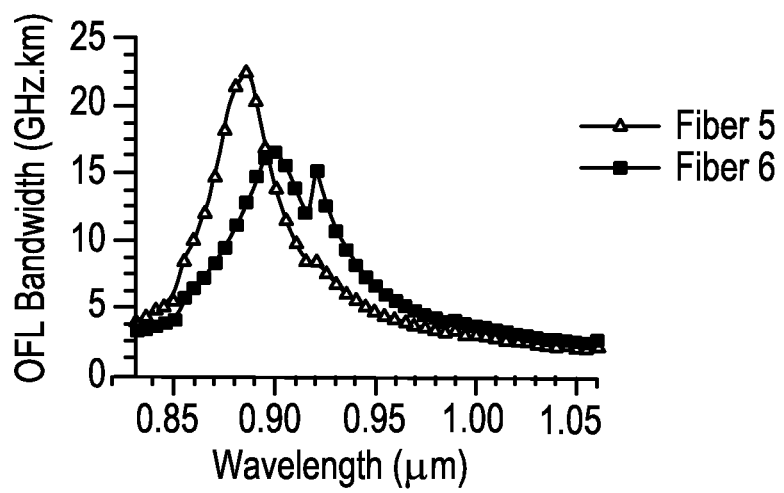
FIGS. 5A and 5B illustrate modeled OFL Bandwidth for two fiber embodiments (fibers 6 and 7)
Figure 5B:
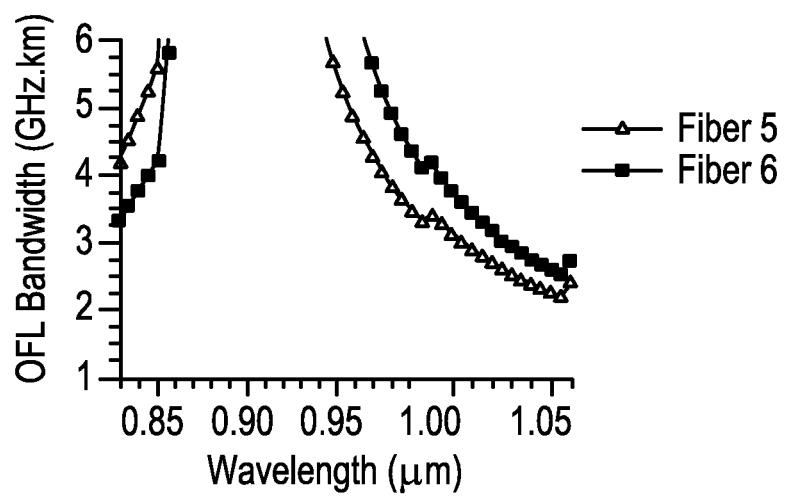

FIGS. 3A and 3B illustrate modeled performance for the comparative fiber (fiber 1, λp=850 nm) and one embodiment of optical fiber 1000 (fiber 2, λp=875 nm). As one can see, fiber 2 embodiment has a significantly larger bandwidth (BW) than that of the comparative fiber 1. It has a smaller alpha value than the comparative fiber 1 and a larger peak modal bandwidth wavelength λp. FIGS. 4A and 4B illustrate modeled performance for two embodiments of optical fibers—fibers 3 and 4. Fiber 3 has the peak modal bandwidth wavelength λp=880 nm, while fiber 4 has the peak modal bandwidth wavelength λp of 890 nm. As one can see, fiber 4 embodiment has a significantly larger bandwidth than that of fiber 3, because of its larger λp value and smaller core diameter. FIGS. 5A and 5B illustrates modeled performance for two more embodiments of optical fibers—i.e., of fibers 5 and 6. As one can see, fiber 6 embodiment has a significantly larger bandwidth than that of the fiber 5 embodiment, because of its smaller core diameter (30 µm vs. 40 µm). Fiber 6 also has a λp than fiber 5 which increases its bandwidth at longer wavelengths. The exemplary fibers 2-6 of Table 1 have NAs not larger than 0.22, preferably 0.18≤NA≤0.22, and core diameters of not greater than 47.5 µm. These results indicate that smaller cores in conjunction with lower NAs (0.22 or less) have reduced material dispersion, thus resulting in higher modal bandwidths. Preferably, according to some embodiments the core diameters ($2R_1$) are in the 20 µm to 47.5 µm range (for example, 22 µm, 24 µm, 25 µm, 30 µm, 32 µm, 35 µm, 40 µm, 45 µm, 47.5 µm or therebetween). Such fibers have modal bandwidths of at least 3 GHz-km at 850 nm and at least 1.2 GHz-km bandwidth at one or more wavelengths situated within the 900-1100 nm range, for example at 900 nm, 980 nm, 1000 nm, or 1060 nm. These fibers would also be able to meet 100 m system reach at 910 nm and in the 980 nm to 1000 nm range, while providing at least 1.2 GHz-.km bandwidth at 1060 nm. Preferably, the fiber core diameters are 22 µm to 45 µm.

Table 1 depicts several multimode fibers. Illustrative fiber 1 (comparative fiber) has a core diameter of 50 µm, refractive index delta of 1%, and peak modal bandwidth wavelength λp=850 nm. More specifically, Table 1 also shows a 47.5 micron core diameter MMF with 1% delta with its peak modal bandwidth wavelength shifted to 875 nm (fiber 2 embodiment). When compared to fiber 1, the bandwidth of fiber 2 at 850 nm is lowered to the value of 7.2 GHz-km and the bandwidth at 1060 nm is increased to 1.68 GHz-km which is noticeably above the 1.2 GHz-km value needed. We have also compared the modeled results for fiber 2 with measured results for the drawn fiber. At the wavelength of 850 nm the predicted bandwidth of the fiber 2 embodiment is 1.82 times larger than the measured bandwidth of the actual drawn fiber. At 1060 nm the predicted bandwidth of fiber 2 is 1.24 times larger than the measured value (i.e., the manufactured fiber was 1.35 GHz-km, which is lower than "ideal" modeled values, but still within the targeted value of at least 1.2 GH-km at that wavelength. A similar change in values (i.e., a similar drop in BW of about 20-30% at 1060 nm from the "ideal" to actual values) for drawn fiber 1 could make it very difficult or impossible to manufacture this fiber to meet the above BW requirement at 1060 nm. FIGS. 3A and 3B illustrate the modeled "ideal" fiber bandwidth as a function of wavelength for both fiber 1 and fiber 2. As we can see, from these figures, at longer wavelength, the OFL bandwidth is substantially higher for fiber 2 than for fiber 1.

Fibers 3 and 4 are also multimode fibers (MMFs) with 1% maximum core delta, but core diameters are 40 microns for fiber 3 and 30 microns for fiber 4, respectively. It is noted found that while at 850 nm the fiber bandwidths are still well above the 3 GHz-km design target, the bandwidth values at 1060 nm are increased to 1.92 and 2.19 GHz-km respectively, and are 60% and 82.5% above the 1.2 GHz-km design target, respectively. Thus, even if the actual BW at 1060 nm is somewhat lower in actual manufactured/drawn fibers based on designs 3 and 4, the drawn fibers 3 and 4 would still perform at or above the 1.2 GHz-km target requirement. FIGS. 4A and 4B show the modeled bandwidth as a function of the wavelengths for these two fibers.

Fibers 5 and 6 are MMFs with the maximum refractive index core delta of 0.9% but with core diameters of 40 microns and 30 microns respectively. With the smaller core refractive index delta, the peak modal bandwidth of the MMFs can be increased, which allows easier shift of λp to higher wavelengths, while maintaining sufficiently high bandwidth for 100 m system reach at 850 nm. The two fibers (fibers 5 and 6) show further increased OFL bandwidth of 2.4 GHz-km and 2.7 GHz-km, which are 100% and 125% above the 1.2 GHz-km design target, respectively. Thus, even if the actual BW at 1060 nm will be lower for the manufactured/drawn fibers 5 and 6, the drawn fibers 5 and 6 would still meet the 1.2 GHz-km performance requirement. The higher bandwidth values allow manufacturing with much looser tolerances of the refractive index profile and λp, so that the drawn fibers can be made with high yield, making it much easier to manufacture than fiber 1. We also note here that the discontinuity in the curve is due to the change of the number of mode groups at higher wavelength, which is a real physical effect. More specifically, FIGS. 5A and 5B illustrate the modeled bandwidth as a function of wavelength for these two fibers.

Figure 6:
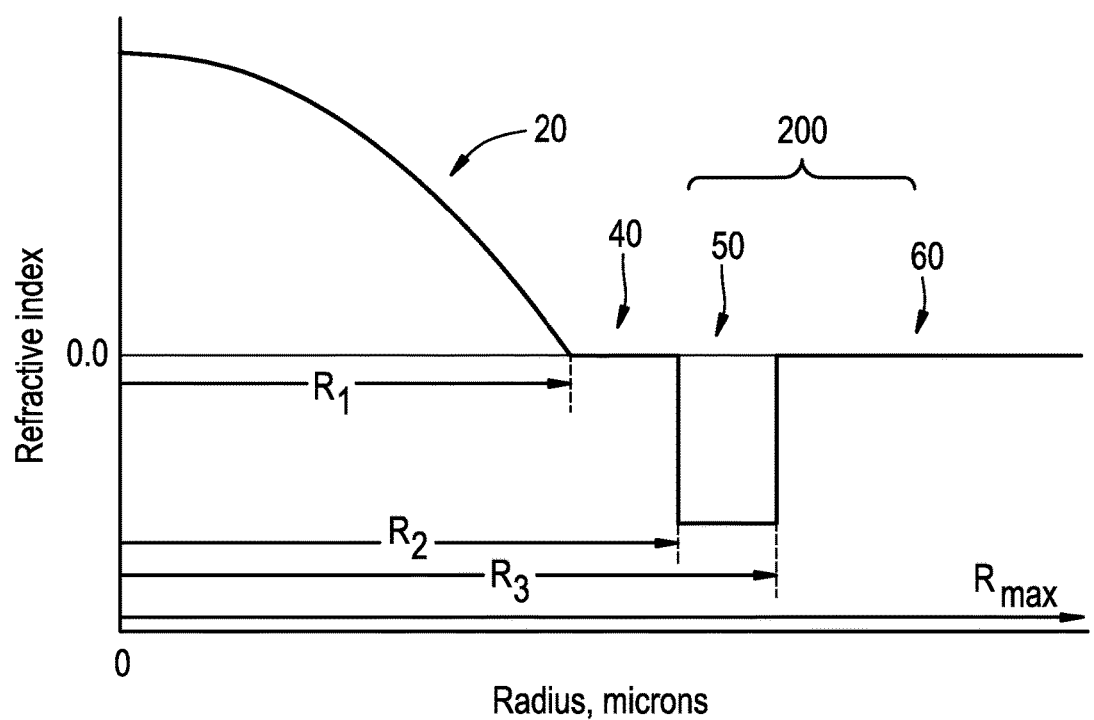
FIG. 6 shows a schematic representation (not to scale) of the refractive index profile of a cross-section of the glass portion of an exemplary embodiment of multimode optical fiber disclosed herein wherein the depressed-index annular portion is offset from the core and is surrounded by an outer annular portion.
Figure 7A:
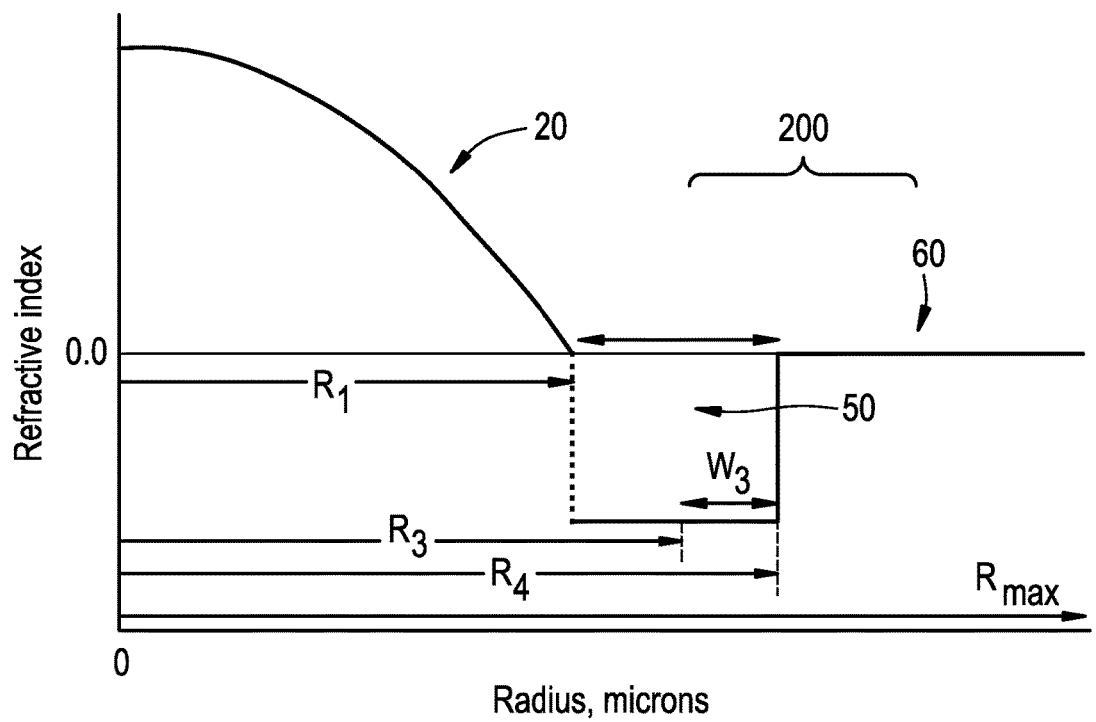
FIG. 7A shows a schematic representation (not to scale) of the refractive index profile of a cross-section of the glass portion of an exemplary embodiment of multimode optical fiber disclosed herein wherein the depressed-index annular portion is not spaced from the core.
Figure 7B:
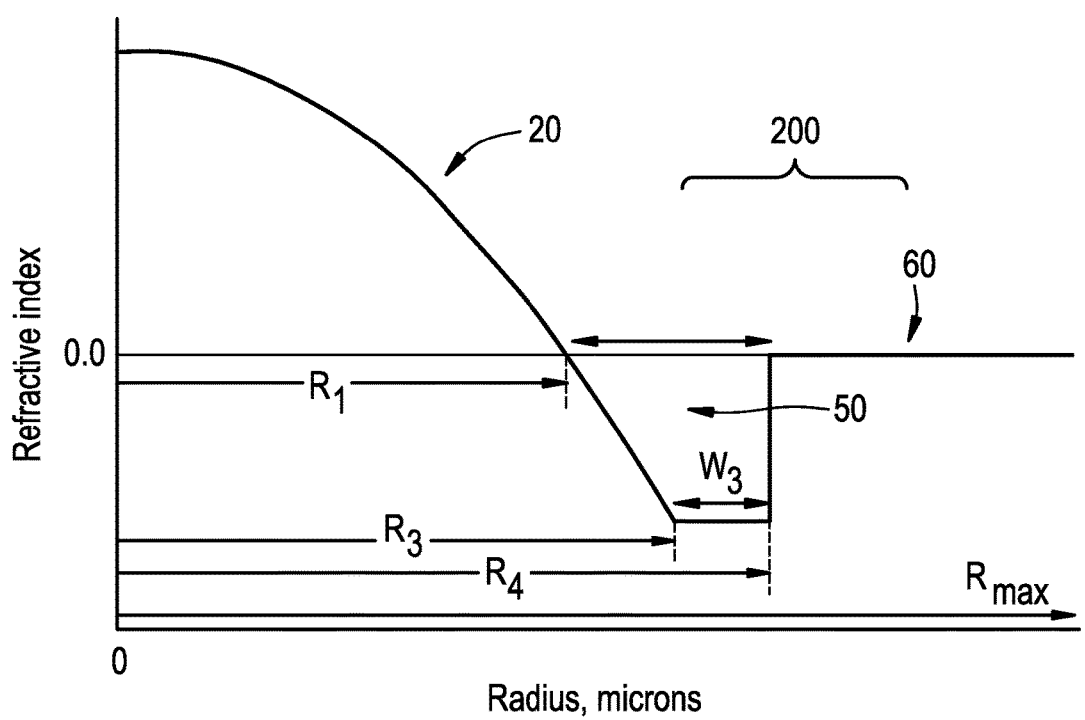
FIG. 7B shows a schematic representation (not to scale) of the refractive index profile of a cross-section of the glass portion of another exemplary embodiment of multimode optical fiber disclosed herein.

The fiber of FIG. 1B has a relatively simple graded refractive index profile. However the bending performance of this fiber may not be adequate for some applications. To improve the bending performance, we designed bend-insensitive optical fibers 100 that have the refractive index profile shown, for example, in FIGS. 6, 7A and 7B. These fibers have a cladding with a depressed-index annular portion 50 (down-doped ring, a cladding region with a low refractive index). The core parameters of fibers of FIGS. 6, 7A and 7B are similar to the core parameters of the fiber corresponding to FIG. 1A. The core radius $R_1$ is preferably 11 to 23.75 µm (e.g., 12.5-23.5 µm, or 14-23.5 µm) and 2.05≤α≤2.15. In some embodiments, preferably 2.08≤α≤2.115, more preferably 2.08≤α≤2.11. The depressed-index annular portion 50 has a minimum refractive index $\Delta_{3MIN}$ less than −0.2%, more preferably between −0.3 and −0.7%. In some embodiments, $\Delta_{3MIN}$ is between −0.5% and −1.2%, or between −0.5% and −1%. In the embodiments of FIG. 6, the width $W_3$ of depressed-index annular portion 50 ($W=R_3-R_2$) is at least 2 microns, preferably between 3 microns and 20 microns, more preferably between 3 and 10 microns (e.g., 3 to 8 microns). The inner annular portion 40 (situated between the core 20 and the depressed-index annular portion 50) is designed such that the difference in time delays between the inner and outer mode groups is minimized. Thus, preferably the width of the inner annular portion 40 ($R_2-R_1$) is less than less than 3 microns, more preferably not greater than 2 microns, for example 1 to 2 microns. By introducing the depressed-index annular portion 50 in the profile design, the bending performance of the optical fiber 100 can be improved. The depressed-index annular portion 50 can be made by F-doping using conventional process such as OVD, MCVD or PCVD. It can also be made by having voids situated within the silica-based glass. The voids can be arranged periodically or randomly.

More specifically, FIG. 6 is a schematic representation of the refractive index profile of a cross-section of the glass portion of one exemplary embodiment of a multimode optical fiber 100 comprising a glass core 20 and a glass cladding 200, the cladding comprising an inner annular portion 40, a depressed-index annular portion 50, and an outer annular portion 60. The core 20 has outer radius $R_1$ and maximum refractive index delta $\Delta 1_{MAX}$. The inner annular portion 40 of FIG. 6 fiber is comprised of refractive index delta $\Delta 2$ and has width $W_2$ and outer radius $R_2$. Depressed-index annular portion 50 has minimum refractive index delta percent $\Delta 3_{MIN}$, width $W_3$ and outer radius $R_3$. The depressed-index annular portion 50 is shown offset, or spaced away, from the core 20 by the inner annular portion 40. In some embodiments, the width of the inner annular portion 40 is less than 3 microns (e.g., 1 to 2 microns—for example 1.2 to 1.6 microns). In some embodiments, $\Delta 3_{MIN}$ occurs at radius $R_{3min}$ wherein $R_{3min}-R_1$ is less than 5.0 microns, for example less than 4.0 microns, preferably less than 3.0 microns, less than 2.0 microns, or less than 1.0 micron.

The depressed-index annular portion 50 surrounds inner annular portion 40. The outer annular portion 60 surrounds and contacts the annular portion 50. The inner annular portion 40 has a refractive index profile $\Delta 2(r)$ with a maximum relative refractive index $\Delta 2_{MAX}$, and a minimum relative refractive index $\Delta 2_{MIN}$, where in some embodiments $\Delta 2(r)$ does not change significantly, i.e., $\Delta 2_{MAX}=\Delta 2_{MIN}$. The depressed-index annular portion 50 has a refractive index profile $\Delta 3(r)$ with a minimum relative refractive index $\Delta 3_{MIN}$. The outer annular portion 60 has a refractive index profile $\Delta 4(r)$ with a maximum relative refractive index $\Delta 4_{MAX}$, and a minimum relative refractive index $\Delta 4_{MIN}$, where in some embodiments $\Delta 4_{MAX}=\Delta 4_{MIN}$. Preferably, $\Delta 1>\Delta 4>\Delta 3$, and preferably in the embodiments illustrated in FIGS. 1A and 6, $\Delta 1_{MAX}>\Delta 2_{MAX}>\Delta 3_{MIN}$. In some embodiments, the inner annular portion 40 has a substantially constant refractive index profile, as shown in FIGS. 1A and 6 with a constant $\Delta 2(r)$; in some of these embodiments, $\Delta 2(r)=0\%$. In some embodiments, the outer annular portion 60 has a substantially constant refractive index profile, as shown in FIG. 6 with a constant $\Delta 4(r)$; in some of these embodiments, $\Delta 4(r)=0\%$. The core 20 preferably has an entirely positive refractive index profile, where $\Delta 1(r)>0\%$. $R_1$ is defined as the radius at which the refractive index delta of the core first reaches value of 0.05%, going radially outwardly from the centerline. Preferably, the core contains substantially no fluorine, and more preferably the core contains no fluorine. In some embodiments, the inner annular portion 40 preferably has a relative refractive index profile $\Delta 2(r)$ having a maximum absolute magnitude less than 0.05%, and $\Delta 2_{MAX}<0.05\%$ and $\Delta 2_{MIN}>-0.05\%$, and the depressed-index annular portion 50 begins where the relative refractive index of the cladding first reaches a value of less than −0.05%, going radially outwardly from the centerline. In some embodiments, the outer annular portion 60 has a relative refractive index profile $\Delta 4(r)$ having a maximum absolute magnitude less than 0.05%, and $\Delta 4_{MAX}<0.05\%$ and $\Delta 4_{MIN}>-0.05\%$, and the depressed-index annular portion 50 ends where the relative refractive index of the cladding first reaches a value of greater than −0.05%, going radially outwardly from the radius where $\Delta 3_{MIN}$ is found.

The outer cladding diameter ($2 \times R_{MAX}$) is preferably less than 150 microns, more preferably less than 135 microns, even more preferably less than 130 microns. In some embodiments, the core diameter ($2 \times R_1$) is between 40 and 70 microns, more preferably between 45 and 55 microns, and the outer cladding diameter is between 120 and 140 microns, more preferably between 120 and 130 microns.

In the multimode optical fibers 100 disclosed herein, the core is a graded-index core, and preferably, the refractive index profile of the core has a substantially parabolic shape; for example, in some embodiments, the refractive index profile of the core has an α-shape with an α value preferably in the range $2.05<\alpha<2.115$, (for example, $2.075<\alpha<2.112$ or $2.08<\alpha<2.111$); more preferably $2.08<\alpha<2.11$ as measured at 900 nm. In some embodiments, the refractive index of the core may have a centerline dip, wherein the maximum refractive index of the core, and the maximum refractive index of the entire optical fiber, is located a small distance away from the centerline, but in other embodiments the refractive index of the core has no centerline dip, and the maximum refractive index of the core, and the maximum refractive index of the entire optical fiber, is located at the centerline. The substantially parabolic shape extends to a radius $R_1$ and preferably extends from the centerline of the fiber to $R_1$. As used herein, "parabolic" therefore includes substantially parabolically shaped refractive index profiles which may vary slightly from an α value of about 2.1 (e.g., 2.05 to 2.15), for example 2.08, 2.09, 2.110, or 2.111, at one or more points in the core, as well as profiles with minor variations and/or a centerline dip. Referring to the FIG. 6 embodiment, the inner annular portion 40 is defined to end at the radius $R_1$, which is about where the parabolic shape ends, coinciding with the innermost radius of the cladding 200. The optical fibers 100 of FIGS. 7A and 7B embodiments are similar to that of fiber of FIG. 6, but do not include the optional inner annular portion 40.

One or more portions of the clad layer 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 is surrounded by at least one coating 210, which may in some embodiments comprise a low modulus primary coating and a high modulus secondary coating.

Preferably, the optical fiber disclosed herein has a silica-based core and cladding. In some embodiments, the cladding 200 has an outer diameter, 2 times Rmax, of about 125 µm. In some embodiments, one or more coatings surround and are in contact with the cladding 200. The coating can be a polymer coating such as an acrylate-based polymer.

In some embodiments, the depressed-index annular portion 50 comprises voids, either non-periodically disposed, or periodically disposed, or both. By "non-periodically disposed" or "non-periodic distribution", we mean that when one takes a cross section (such as a cross section perpendicular to the longitudinal axis) of the optical fiber, the non-periodically disposed voids are randomly or non-periodically distributed across a portion of the fiber. Similar cross sections taken at different points along the length of the fiber will reveal different cross-sectional hole patterns, i.e., various cross sections will have different hole patterns, wherein the distributions of voids and sizes of voids do not match. That is, the voids or voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. While not wishing to be bound by theory, it is believed that the voids extend less than a few meters, and in many cases less than 1 meter along the length of the fiber. Optical fiber 100 disclosed herein can be made by methods which utilize preform consolidation conditions which result in a significant amount of gases being trapped in the consolidated glass blank, thereby causing the formation of voids in the consolidated glass optical fiber preform. Rather than taking steps to remove these voids, the resultant preform is used to form an optical fiber with voids, or voids, therein. As used herein, the diameter of a hole is the longest line segment whose endpoints are disposed on the silica internal surface defining the hole when the optical fiber is viewed in perpendicular cross-section transverse to the longitudinal axis of the fiber.

In some embodiments, the inner annular portion 40 of the optical fiber 100 (for example, shown in FIG. 6) comprises silica which is substantially undoped with either fluorine or germania. Preferably, the annular portion 40 comprises a width of less than 4.0 microns, more preferably less than 2.0 microns. In some embodiments, the outer annular portion 60 comprises substantially undoped silica, although the silica may contain some amount of chlorine, fluorine, germania, or other dopants in concentrations that collectively do not significantly modify the refractive index. In some embodiments, the depressed-index annular portion 50 comprises silica doped with fluorine and/or boron. In some other embodiments, the depressed-index annular portion 50 comprises silica containing a plurality of non-periodically disposed voids. The voids can contain one or more gases, such as argon, nitrogen, krypton, $CO_2$, $SO_2$, or oxygen, or the voids can contain a vacuum with substantially no gas; regardless of the presence or absence of any gas, the refractive index in the annular portion 60 is lowered due to the presence of the voids. The voids can be randomly or non-periodically disposed in the annular portion 60 of the cladding 200. In other embodiments, the voids are disposed periodically in the annular portion 60. Alternatively, or in addition, the depressed index in the annular portion 50 can also be provided by downdoping the annular portion 60 (such as with fluorine) or updoping one or more portions of the cladding and/or the core, wherein the depressed-index annular portion 50 is, for example, silica which is not doped as heavily as the inner annular portion 40. Preferably, the minimum relative refractive index, or average effective relative refractive index, taking into account the presence of any voids, of the depressed-index annular portion 50 is preferably less than −0.1%, more preferably less than about −0.2 percent, even more preferably less than about −0.3 percent, and most preferably less than about −0.4 percent.

FIG. 7A is a schematic representation of the refractive index profile of a cross-section of the glass portion of an alternative exemplary embodiment of a multimode optical fiber comprising a glass core 20 and a glass cladding 200, the cladding comprising an a depressed-index annular portion 50, and an outer annular portion 60. The core 20 has outer radius $R_1$ and maximum refractive index delta $\Delta 1_{MAX}$. The depressed-index annular portion 50 has minimum refractive index delta percent $\Delta 3_{MIN}$, width $W_3$ and outer radius $R_3$. The depressed-index annular portion 50 surrounds and is in direct contact with the core 20, i.e., there is no inner cladding region 40 (having $\Delta 2$) between the core 20 and the depressed-index annular portion 50 (i.e., $R_1 = R_2$). Preferably, $\Delta 1 > \Delta 4 > \Delta 3$. The outer annular portion 60 surrounds and contacts the depressed-index annular portion 50. The depressed-index annular portion 50 has a refractive index profile $\Delta 3(r)$ with a minimum relative refractive index $\Delta 3_{MIN}$. The outer annular portion 60 has a refractive index profile $\Delta 4(r)$ with a maximum relative refractive index $\Delta 4_{MAX}$, and a minimum relative refractive index $\Delta 4_{MIN}$, where in some embodiments $\Delta 4_{MAX} = \Delta 4_{MIN}$. Preferably, $\Delta 1_{MAX} > \Delta 3_{MIN}$. Preferably, the core 20 is doped with germania and contains substantially no fluorine, more preferably the core contains no fluorine. In some embodiments, the depressed-index annular portion 50 begins where the relative refractive index of the cladding first reaches a value of −0.05%, going radially outwardly from the centerline. In some embodiments, the outer annular portion 60 has a relative refractive index profile $\Delta 4(r)$ having a maximum absolute magnitude less than 0.05%, and $\Delta 4_{MAX} < 0.05\%$ and $\Delta 4_{MIN} > -0.05\%$, and the depressed-index annular portion 50 ends where the relative refractive index of the cladding first reaches a value of −0.05%, going radially outwardly from the radius where $\Delta 3_{MIN}$ is found. Referring to the FIG. 7A, in this embodiment, the core 20 ends at the radius $R_1$ (about where the parabolic shape ends).

FIG. 7B is a schematic representation of the refractive index profile of a cross-section of the glass portion of an alternative exemplary embodiment of a multimode optical fiber comprising a glass core 20 and a glass cladding 200, the cladding comprising an inner annular portion 40, a depressed-index annular portion 50, and an outer annular portion 60. The core 20 has outer radius $R_1$ and maximum refractive index delta $\Delta 1_{MAX}$.

In this embodiment the core 20 also has a parabolic (or substantially parabolic) profile. In some embodiments, the refractive index of the core 20 may have a centerline dip, wherein the maximum refractive index of the core, and the maximum refractive index of the entire optical fiber, is located a small distance away from the centerline, but in other embodiments the refractive index of the core has no centerline dip, and the maximum refractive index of the core (and thus maximum refractive index delta $\Delta 1_{MAX}$) and the maximum refractive index of the entire optical fiber 100, is located at the centerline.

The inner annular portion 40 has a refractive index profile $\Delta 2(r)$ with a maximum relative refractive index $\Delta 2_{MAX}$, and a minimum relative refractive index $\Delta 2_{MIN}$. In this embodiment the parabolic shape of the core extends to outer radius $R_2$ and of the inner annular portion 40 and preferably extends from the centerline of the fiber to $R_2$. Referring to the FIG. 7B embodiments, the inner annular portion 40 of this embodiment(s) is defined to end at the radius $R_2$ where the parabolic shape ends. As used herein, "parabolic" therefore includes substantially parabolically shaped refractive index profiles which may vary slightly from an α value of about 2.1, for example 2.05 to 2.15 or 2.08 to 2.11.

The depressed-index annular portion 50 has minimum refractive index delta percent $\Delta 3_{MIN}$, width $W_3$ and outer radius $R_3$. The depressed-index annular portion 50 surrounds and is in direct contact with the inner annular portion

40. Preferably, $\Delta 1 > \Delta 4 > \Delta 3$. The outer annular portion 60 surrounds and contacts the depressed-index annular portion 50. The depressed-index annular portion 50 has a refractive index profile $\Delta 3(r)$ with a minimum relative refractive index $\Delta 3_{MIN}$. The outer annular portion 60 has a refractive index profile $\Delta 4(r)$ with a maximum relative refractive index $\Delta 4_{MAX}$, and a minimum relative refractive index $\Delta 4_{MIN}$, where in some embodiments $\Delta 4_{MAX} = \Delta 4_{MIN}$. Preferably, $\Delta 1_{MAX} > \Delta 3_{MIN}$. Preferably, the core 20 is doped with germania and contains substantially no fluorine, more preferably the core contains no fluorine. In some embodiments, the depressed-index annular portion 50 begins where the relative refractive index of the cladding first reaches a value of $-0.05\%$, going radially outwardly from the centerline. In some embodiments, the outer annular portion 60 has a relative refractive index profile $\Delta 4(r)$ having a maximum absolute magnitude less than 0.05%, and $\Delta 4_{MAX} < 0.05\%$ and $\Delta 4_{MIN} > -0.05\%$, and the depressed-index annular portion 50 ends where the relative refractive index of the cladding first reaches a value of $-0.05\%$, going radially outwardly from the radius where $\Delta 3_{MIN}$ is found.

The depressed-index annular portion 50 can be made by F-doping using conventional process such as OVD, MCVD or PCVD. It can also be made by having voids situated within the silica-based glass. The voids can be arranged periodically or randomly. The inner annular portion 40 can be silica based, made by F-doping using a conventional process such as OVD, MCVD or PCVD. It can also be made by having voids situated within the silica-based glass. The voids can be arranged periodically or randomly.

Figure 8A:
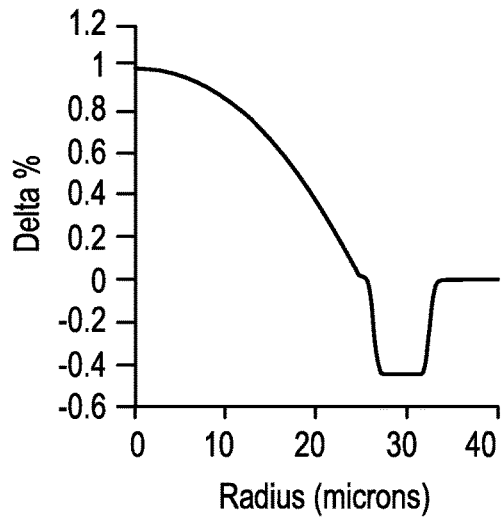
FIG. 8A illustrates an exemplary modeled refractive index delta profile for one embodiment of multimode optical fiber disclosed herein.

FIG. 8A illustrates an exemplary modeled refractive index delta profile for one embodiment of optical fiber 100 disclosed herein, corresponding to FIG. 1A. This refractive index delta profile is similar to that of FIG. 6, with the cladding including a small inner cladding portion 40, a depressed-index annular portion 50, and an outer annular portion 60. This fiber has $\Delta 1_{MAX} = 1\%$; $R_1 = 23.75$ μm; $\Delta 2 = 0\%$; $R2-R1 = 1.3$ μm, $\Delta 3_{MIN} = -0.45\%$; $W_3 = 5$ μm. $R_4 = 62.5$ μm.

Figure 9A:
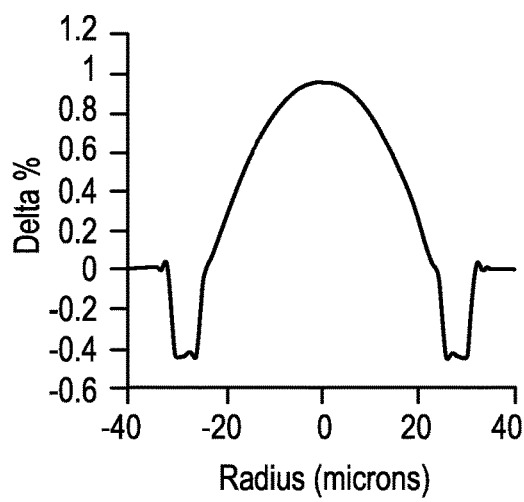
FIG. 9A illustrates an exemplary modeled refractive index delta profile for one embodiment of multimode optical fiber disclosed herein.

FIG. 9A illustrates an exemplary modeled refractive index delta profile for one embodiment of optical fiber 100 disclosed herein, corresponding to FIG. 1A. This refractive index delta profile is similar to that of FIG. 6, with the cladding including a small inner cladding portion 40, a depressed-index annular portion 50, and an outer annular portion 60.

This fiber has parameters shown in Table 2, below.

TABLE 2

| | |
|---|---|
| Core Delta (%) | 0.967 |
| Core Alpha | 2.11 |
| Core Radius R1 (μm) | 23.38 |
| Width of inner cladding 40 (μm) | 1.2 |
| Inner cladding (%) | 0 |
| Trench Volume (%-sq. um) | 150.7 |
| trench Delta (%) Trench width | −0.44 |

Figure 8B:
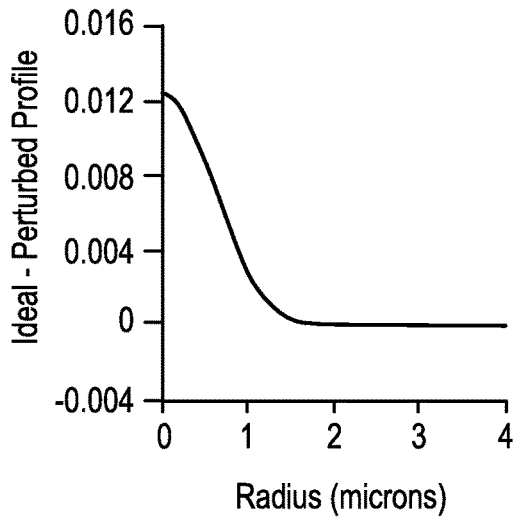
FIG. 8B illustrates the difference between the perturbed refractive index delta profile and that illustrated in FIG. 8A.
Figure 9B:
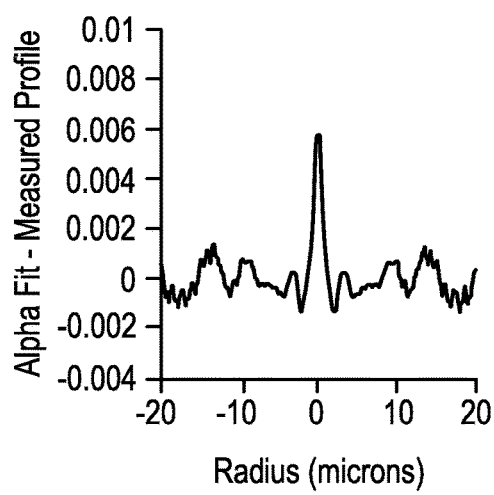
FIG. 9B illustrates the difference between the perturbed refractive index delta profile and that illustrated in FIG. 9A.
Figure 10:
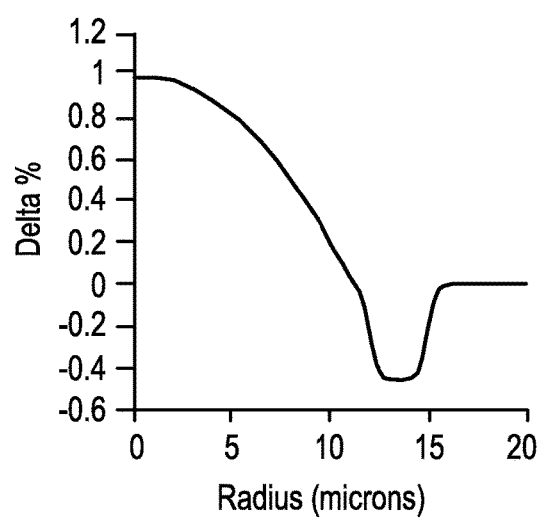
FIG. 10 shows a schematic representation (not to scale) of the refractive index profile of a cross-section of the glass portion of another exemplary embodiment of multimode optical fiber disclosed herein.

FIG. 8B illustrates the difference between the perturbed refractive index delta profile and that illustrated in FIG. 8A, which is due to a 1 μm radius dip in the center of the fiber (centerline dip). This is an exemplary perturbation that can occur in the MMF fiber manufacturing process; other small perturbations are also possible. FIG. 9A illustrates another exemplary modeled refractive index delta profile for one embodiment of optical fiber 100 disclosed herein, corresponding to FIG. 1A. This refractive index delta profile is similar to that of FIG. 6, with the cladding including a small inner cladding portion 40, a depressed-index annular portion 50, and an outer annular portion 60. FIG. 9B illustrates the difference between the actual refractive index delta profile and that illustrated in FIG. 5A, which is due to a 1 μm radius dip in the center of the fiber (centerline dip). The measured fiber profile shown in FIG. 9 has very small deviations from an alpha profile in the radial range from 2 to 20 microns, and although there is a small centerline dip, it results in a very small deviation from an alpha function. FIG. 10 illustrates another exemplary modeled refractive index delta profile for one embodiment of optical fiber 100 disclosed herein, corresponding to FIG. 1A.

The optical fibers 100 disclosed herein exhibit an overfilled bandwidth of at least 3 GHz-km at a wavelength of 850 nm, an overfilled bandwidth of at least 2 GHz-km at a wavelength of 910 nm, and an overfilled bandwidth of at least 1.2 GHz-km at a wavelength of 1000 nm.

Table 3, below provides bandwidth (GHz-km) information for 47.5 micron diameter fibers similar to that of FIG. 8A that have alpha values optimized to provide peak modal bandwidth wavelength λp at 890 nm, (example A), 910 nm (example B) and 930 nm (example C).

For example, a 47.5 micron diameter core ($R_1 = 23.75$ microns) with the refractive delta profile shown in FIG. 8A, the ideal refractive index profile yields the bandwidths (in GHz-km) shown in Table 3, and has an ideal profile with λp near 890 nm that satisfies the above requirements for BW at 890 nm, 910 nm and 1000 nm wavelengths. This is shown, as example, for fiber A in Table 3, below. If a small centerline dip is added to the fiber profile, with twice the depth of the example plotted in FIGS. 8A and 9A, the peak modal bandwidth wavelength λp shifts slightly lower because the LP01 mode moves slightly faster than in the unperturbed profile. The peak modal bandwidth wavelength λp slightly decreases, but there is very little impact on the bandwidths at 850 and 1020 nm. As shown in Table 3, if example A fiber was manufactured with a centreline dip, the model indicates that even at the wavelength of 1020 nm the overfilled bandwidth is least 1.24 GHz-km. Table 4 indicates that even if the actual fiber profile departs slightly from the modeled or ideal profile, the optical fiber still meets the required specification of providing an overfilled bandwidth of at least 1.2 GHz-km at a wavelength of 1000 nm. Thus, it is possible to meet the CWDM criteria by taking care to have an optimum value of λp, i.e., λp>850 nm, for example 860 nm<λp<935 nm, or 860 nm≤λp≤930 nm, or even more preferably 870 nm<λp<930 nm.

TABLE 1

Modeled bandwidths (BW) of fibers with ideal profiles and core diameter of 47.50 microns and core delta = 1%. The BWs are calculated at wavelengths of 850 nm, 870 nm, 910 nm, 930 nm, 980 nm, 1020 nm and 1060 nm.

| Profile optimized for λp nm | BW at 850 nm | BW at 870 nm | BW at 890 nm | BW at 910 nm | BW at 930 nm | BW at 950 nm | BW at 980 nm | BW at 1020 nm | BW at 1060 nm |
|---|---|---|---|---|---|---|---|---|---|
| Example A: 890-opt | 3.5035 | 7.2093 | 19.0162 | 6.8092 | 4.043 | 2.7033 | 1.9951 | 1.3496 | 1.1449 |
| Example B: 910-opt | 2.3751 | 3.8113 | 7.0201 | 19.8034 | 8.1713 | 4.2418 | 2.6739 | 1.6582 | 1.3459 |
| Example C: 930-opt | 1.8848 | 2.7353 | 4.0604 | 7.9641 | 19.6081 | 7.609 | 3.68 | 2.0246 | 1.566 |

TABLE 4

Modelled bandwidths of perturbed fiber profiles (fiber profiles similar to those in Table 3, but with a centerline dip).

| Profile optimized for λp nm | BW at 850 nm | BW at 870 nm | BW at 890 nm | BW at 910 nm | BW at 930 nm | BW at 950 nm | BW at 980 nm | BW at 1020 nm | BW at 1060 nm |
|---|---|---|---|---|---|---|---|---|---|
| Example A 890-opt | 4.2722 | 8.9563 | 8.7949 | 4.5605 | 3.1265 | 2.2798 | 1.7575 | 1.2442 | 1.0666 |
| Example B 910-opt | 2.7462 | 4.7161 | 8.6723 | 9.2055 | 5.0338 | 3.2545 | 2.2552 | 1.4996 | 1.2378 |
| Example C 930-opt | 2.1225 | 3.2345 | 5.0317 | 9.5983 | 8.6538 | 4.8583 | 2.9165 | 1.7905 | 1.4204 |

Tables 1 and 2 also indicate that if alpha profiles of 47.5 μm core diameter fibers were tweaked to provide fiber designs that are optimized to provide slightly greater λp values, (for example λp=910 nm, λp=930 nm, as is in fiber examples B and C), the fibers with unperturbed refractive index delta profiles (relative to the design profile) meet the requirements of having an overfilled bandwidth of at least 3 GHz-km at a wavelength of 850 nm, an overfilled bandwidth at a wavelength of 910 nm of at least 2 GHz-km, and an overfilled bandwidth of at least 1.2 GHz-km at a wavelength of 1000 nm. The fibers with perturbed refractive index delta profiles also meet these requirements. Furthermore, as shown in Table 4, fibers B and C even when modeled with a center line dip, i.e., when refractive index delta departed from the ideal alpha shape (for example during manufacturing), perform better at 1020 nm wavelength than fiber A. More specifically, the an overfilled bandwidth at a wavelength of 1020 nm for fiber examples B and C is 1.4996 and 1.7905 GHz-km, vs. 1.2442 GHz-km for example fiber A. This indicates that these fibers could be manufactured with less stringent tolerances than fiber A because they exhibit a slightly longer peak modal bandwidth wavelengths λp (i.e., the alpha value of this fiber profiles is a little smaller than that of example A fiber).

We analyzed similar optical fibers 100, but with smaller core diameters ($R_1$ of 12 and 15.5 microns). The refractive index delta profile for a fiber with a core diameter of 24 microns ($R_1$=12 μm) is illustrated in FIG. 10. The refractive index delta profile for the fiber with the core diameter of 31 microns is similar to one shown in FIG. 10, with the same relative maximum refractive index core delta, but larger core radius $R_1$ for the core, and the same refractive index deltas and width for the cladding portions 40 and 50. In these embodiments R4=62.5.

Table 5 illustrates the modelled bandwidths over the target wavelength range for the optical fiber 100 with core radius $R_1$=15.5 microns. The peak modal bandwidths increase by about 50%, and the bandwidths at 850 nm and 1020 nm are also higher. Table 6 shows that this is still the case when the profile has a centerline perturbation of the same magnitude as in Table 4. Note that the peak modal bandwidth is lower than for the examples in Table 4 because the LP01 mode carries a higher fraction of the power than in larger core designs, and the negative impact of the centerline is more pronounced.

TABLE 5

Modelled bandwidths of ideal profiles with a core delta = 1%, and a core diameter of 31 microns.

| Profile optimized for λp nm | BW at 850 nm | BW at 870 nm | BW at 890 nm | BW at 910 nm | BW at 930 nm | BW at 950 nm | BW at 980 nm | BW at 1020 nm | BW at 1060 nm |
|---|---|---|---|---|---|---|---|---|---|
| 890-opt | 3.6486 | 8.4273 | 29.2129 | 8.1639 | 4.2015 | 2.7867 | 2.1908 | 1.5148 | 1.1416 |
| 910-opt | 2.4989 | 4.3882 | 8.4337 | 29.7941 | 8.5705 | 4.3234 | 2.9009 | 1.8478 | 1.5989 |
| 930-opt | 1.9422 | 2.996 | 4.4513 | 8.5864 | 32.926 | 8.3686 | 4.1642 | 2.3087 | 1.8986 |

TABLE 4

Modelled bandwidths of profiles with core delta = 1%, a centerline dip and a core diameter of 31 microns.

| Profile optimized for λp nm | BW at 850 nm | BW at 870 nm | BW at 890 nm | BW at 910 nm | BW at 930 nm | BW at 950 nm | BW at 980 nm | BW at 1020 nm | BW at 1060 nm |
|---|---|---|---|---|---|---|---|---|---|
| 890-opt | 4.2672 | 4.6785 | 3.7993 | 2.9143 | 2.2788 | 1.8356 | 1.5451 | 1.1959 | 0.9615 |
| 910-opt | 3.1777 | 4.6426 | 4.7141 | 3.8743 | 2.986 | 2.3315 | 1.8445 | 1.386 | 1.2442 |
| 930-opt | 2.463 | 3.7995 | 4.7094 | 4.8216 | 3.9624 | 3.0256 | 2.245 | 1.6193 | 1.4118 |

Finally, Table 7 illustrates the modeled bandwidths over the target wavelength range for the ideal profile with a core diameter of 24 microns (FIG. 10 profile). The peak modal bandwidths at 850 nm and 1020 nm are also significantly higher than those in either Table 3 or Table 5. Table 8 shows that this is still the case when the profile has a centerline perturbation of the same magnitude as in Table 4. The peak modal bandwidth is still lower than for the examples in Table 6 because the negative impact of the centerline is more pronounced. Thus, it is preferable that the fiber core diameter ($2R_1$) be smaller than 48 microns, preferably not larger than 45 microns, more preferably not larger than 40 microns, and that the fibers have peak modal bandwidth wavelength λp where 860 nm≤λp≤930 nm and more preferably 870 nm≤λp≤930 nm. The numerical aperture (NA) of the optical fiber is preferably greater than the NA of the optical source directing signals into the fiber; for example, the NA of the optical fiber is preferably greater than the NA of a VCSEL source. Typical NA fiber values are from 0.185 to 0.215, however these have very little impact on the bandwidths at the edges of the CWDM window.

Set forth below in Table 9 are a variety of modeled fiber examples in accordance with the embodiments of the present invention. Fiber examples 7-15 exhibit refractive index profiles similar to those illustrated by FIG. 6, and similar to those illustrated by FIG. 1A. In particular, provided below are $\Delta 1_{MAX}$ of core region 20, outer radius R1 of core region 20, alpha of core region 20, $\Delta 3_{MIN}$ of depressed index cladding region 50, outer radius R3 of depressed index cladding region 50. Clad radius is the outermost radius of the fiber as well as the outer radius of the outer annular glass cladding portion 60 are provided. In each case, conventional primary and secondary urethane acrylate based protective coatings are applied to the outside of the glass optical fibers. These fibers' designs are optimized to provide high bandwidth at operating wavelengths of 850 nm, 910 nm and 1020 nm, with an overfilled bandwidth of at least 3 GHz-km at a wavelength of 850 nm, an overfilled bandwidth of at least 2

TABLE 7

Modelled bandwidths of ideal profiles with a core diameter of 24 microns.

| Profile optimized for λp nm | BW at 850 nm | BW at 870 nm | BW at 890 nm | BW at 910 nm | BW at 930 nm | BW at 950 nm | BW at 980 nm | BW at 1020 nm | BW at 1060 nm |
|---|---|---|---|---|---|---|---|---|---|
| 890-opt | 3.9562 | 8.4473 | 41.85 | 7.2746 | 5.2291 | 3.3385 | 2.274 | 1.5966 | 1.5278 |
| 910-opt | 2.8294 | 4.2858 | 8.1691 | 42.7233 | 11.5273 | 5.206 | 3.0355 | 1.9503 | 1.7993 |
| 930-opt | 2.1585 | 2.8792 | 4.1603 | 8.8783 | 47.7 | 11.1712 | 4.53 | 2.5245 | 2.1649 |

TABLE 6

Modelled bandwidths of profiles with a centerline dip and a core diameter of 24 microns.

| Profile optimized for λp nm | BW at 850 nm | BW at 870 nm | BW at 890 nm | BW at 910 nm | BW at 930 nm | BW at 950 nm | BW at 980 nm | BW at 1020 nm | BW at 1060 nm |
|---|---|---|---|---|---|---|---|---|---|
| 890-opt | 3.389 | 3.1449 | 2.6694 | 2.2065 | 1.8607 | 1.6259 | 1.3563 | 1.101 | 1.0642 |
| 910-opt | 3.2358 | 3.4561 | 3.2244 | 2.7373 | 2.2213 | 1.9196 | 1.5726 | 1.2497 | 1.1821 |
| 930-opt | 2.7707 | 3.236 | 3.4706 | 3.2794 | 2.6467 | 2.2839 | 1.8489 | 1.4435 | 1.3179 |

As shown in Tables 1-6, we have demonstrated the feasibility of CWDM operation of MMFs with core diameters ranging from 20 to 47.5 microns. We have demonstrated that there are e several possible profile deviations that can impact the peak modal bandwidth of the fiber, including the centerline dip used in the examples described above; GHz-km at a wavelength of 910 nm, and an overfilled bandwidth of at least 1.2 GHz-km at one or more wavelengths in the 1000 to 1060 nm range. In at least some embodiments of the fibers of Table 9, the fiber is designed to perform well at three operating wavelengths: 850 nm, 910 nm, and 1060 nm.

TABLE 9

| Parameter | Example 7 | Example 8 | Example 9 | Example 10 | Example 11 | Example 12 | Example 13 | Example 14 | Example 15 |
|---|---|---|---|---|---|---|---|---|---|
| $\Delta_{1MAX}$ (%) | 1.02 | 1.02 | 1.02 | 1.02 | 1.02 | 1.02 | 1.02 | 1.02 | 1.02 |
| $R_1$ (micron) | 20.9 | 20.9 | 20.9 | 14.45 | 14.45 | 14.45 | 11.4 | 11.14 | 11.14 |
| Alpha | 2.08952 | 2.08337 | 2.07828 | 2.09175 | 2.08583 | 2.07992 | 2.09289 | 2.08742 | 2.08104 |
| $\Delta_2$ (%) | 0 | 0 | 0 | 0 | 0 | 0 | 0 | | |
| $R_2$ (micron) | 22.338 | 22.359 | 22.368 | 15.4781 | 15.4875 | 15.4831 | 11.9832 | 11.99107 | 11.9935 |
| $\Delta_{3\,MIN}$ (%) | −0.45 | −0.45 | −0.45 | −0.45 | −0.45 | −0.45 | −0.45 | −0.45 | −0.45 |
| $R_3$ (micron) | 28.5 | 28.5 | 28.5 | 18.75 | 18.75 | 18.75 | 15 | 15 | 15 |
| $\Delta_4$ (%) | 0 | 0 | 0 | 0 | 0 | 0 | 0 | 0 | 0 |
| Rmax (micron) | 62.5 | 62.5 | 62.5 | 62.5 | 62.5 | 62.5 | 62.5 | 62.5 | 62.5 |

Typical fiber performance parameters for the fibers of Table 9 are provided below in Table 10.

TABLE 9

| | |
|---|---|
| Attenuation at 850 nm (dB/km) | 2.22 |
| Attenuation at 910 nm (dB/km) | 1.74 |
| Attenuation at 980 nm (dB/km) | 1.38 |
| Attenuation at 1060 nm (dB/km) | 1.11 |
| Dispersion at 850 nm (ps/nm/km) | −91.8 |
| Dispersion at 910 nm (ps/nm/km) | −69.7 |
| Dispersion at 980 nm (ps/nm/km) | −49.9 |
| Dispersion at 1060 nm (ps/nm/km) | −32.7 |

According to one embodiment, the system 200 comprises: (i) at least one light source (e.g., VCSEL 205), wherein the light source (e.g., VCSEL 205) transmits at a bit rate of t least 16 Gb/s, preferably at least 25 Gb/s (and, according to some embodiments, at 28 Gb/s or higher (e.g., 32 Gb/s, or 40 Gb/s, or 50 Gb/s, 56 Gb/s, or 60 Gb/s).) at one or more wavelengths between 900 and 1200 nm (e.g., between 940 and 1100 nm); (ii) at least one multimode optical fiber 100; and (iii) a detector 210. The detector is optically coupled to the multimode optical fiber 100 and capable of detecting a wavelength in the range of 900 nm to 1250 nm. In these embodiments, the optical fiber 100 comprises a graded index glass core, an inner cladding region surrounding said core and an outer cladding, and has an overfilled bandwidth of at least 3 GHz-km at a wavelength of 850 nm, an overfilled bandwidth of at least 1.2 GHz-km at one or more wavelengths between 1000 nm and 1060 nm, an alpha between 2.08 and 2.115; and a dispersion magnitude less than 60 ps/nm/km at one or more wavelengths situated in the 900 nm to 1060 nm range and an attenuation less than 1.5 dB/km at one or more wavelengths situated in the 900 nm to 1060 nm range. In some embodiments, for example, the light source (e.g., VCSEL 205, or a laser, etc) transmits at a bit rate of 30 GHz, in some embodiments 35 GHz or 37 GHz, in some embodiments 40, GHz and in some embodiments 45 GHz.

One embodiment of such system comprises, for example: (i) at least one VCSEL, the VCSEL transmitting at a bit rate of 25 GHz or higher (and preferably, according to some embodiments) at 40 GHz or higher (i.e., greater than 4 GHz/km)) at one or more wavelengths between 940 and 1100 nm; (ii) a multimode optical fiber optical fiber 100; and (iii) a detector. The fiber 100, for example, comprises a graded index glass core; an inner cladding surrounding and in contact with the core, and a second cladding comprising a depressed-index annular portion surrounding the inner cladding, said depressed-index annular portion having a refractive index delta less than about −0.2% and a width of at least 1 micron, wherein said core has a radius greater than 12.5 microns and less than 48 microns, a maximum refractive index between 0.8 and 1.1%, and an alpha between 2.08 and 2.115 herein. The fiber 100 exhibits an overfilled bandwidth of at least 3 GHz-km at a wavelength of 850 nm, an overfilled bandwidth of at least 1.2 GHz-km at one or more wavelengths between 1000 and 1060 nm, a dispersion magnitude less than 60 ps/nm/km at one or more wavelengths between 1000 and 1060 nm and an attenuation less than 1.5 dB/km at one or more wavelengths between 1000 and 1060 nm.

The above described system embodiment has the following advantages: energy efficiency and bit rate. The VCSELs operating at 980 nm require only about 43% of the electrical current of 850 nm VCSELs, while 1060 nm VCSELs require only about 21% of the electrical current. Electrical power consumption is a serious problem in modern data centers, and longer systems that utilized longer wavelength (≥950 nm) light sources such as VCSELs (≥950 nm) in conjunction with the optical fiber 100 would mitigate some of energy consumption problems faced by the transmission systems operating at 850 nm. In addition, there appear to be significant hurdles to increasing the speed of the systems above 35 GHz-km if the of operation wavelength of the transmission system is about 850 nm. Utilizing longer wavelength light sources (≥950 nm), for example VCSELs based on In—Ga—As semiconductors, in conjunction with the optical fiber 100 enables a transmission system with significantly higher transmission speeds than what is currently available (for example, ≥20 Gb/s, or ≥25 Gb/s or ≥28 Gb/s, or ≥32 Gb/s≥32 or ≥35 Gb/s, or ≥35 Gb/s; ≥35 Gb/s, or ≥40 GHz-km).

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. A multimode optical fiber comprising:
a graded index glass core comprising refractive index $\Delta 1$, a maximum refractive index delta $\Delta 1_{MAX}$, wherein $0.75\% \leq \Delta 1_{MAX} \leq 1.2\%$, and a radius $R_1$ between 11.5 and 22.5 microns, and NA of 0.18 to 0.22; and cladding region surrounding said core, wherein said fiber core has an alpha value between 2.05 and 2.15, a peak modal bandwidth wavelength λp>860 nm and said fiber exhibits a microbend sensitivity of less than 0.6, an overfilled bandwidth of at least 3 GHz-km at a wavelength of 850 nm and an overfilled bandwidth of at least 1.2 GHz-km at one or more wavelengths between 980 nm and 1060 nm.

2. The multimode fiber of claim 1, wherein said alpha value is between 2.08 and 2.115 and 870≤λp≤930 nm.

3. The multimode fiber of claim 1, wherein the fiber exhibits an overfilled bandwidth at a wavelength of 850 nm of at least 3 GHz-km, an overfilled bandwidth of at least 2 GHz-km at one or more wavelengths between 900 and 910 nm, and an overfilled bandwidth of at least 1 GHz-km at a wavelength of 1000 nm.

4. The multimode fiber of claim 1, wherein fiber exhibits an overfilled bandwidth of at least 3 GHz-km at a wavelength of 850 nm, an overfilled bandwidth of at least 2 GHz-km at a wavelength of 920 nm, and an overfilled bandwidth of at least 1.2 GHz-km at a wavelength of 1060 nm.

5. The multimode fiber of claim 1, wherein said core comprises silica doped with Ge, and no other dopants in the amount greater than 1 wt %.

6. The multimode optical fiber of claim 1, wherein said fiber has an alpha value between 2.075 and 2.115, a peak modal bandwidth wavelength 930 nm≥λp≥870 nm and exhibits an overfilled bandwidth of at least 3 GHz-km at a wavelength of 850 nm, an overfilled bandwidth of at least 2 GHz-km at one or more wavelengths between 900 nm and 910 nm, and an overfilled bandwidth of at least 1.2 GHz-km at one or more wavelengths between 1000 and 1060 nm.

7. The multimode fiber according to claim 1, wherein $0.9\% \leq \Delta 1_{MAX} \leq 1.2\%$.

8. A multimode optical fiber comprising:
a graded index glass core comprising refractive index delta Δ1, a maximum refractive index delta $\Delta 1_{MAX}$ wherein $0.75\% \leq \Delta 1_{MAX} \leq 1.2\%$, said core comprising a core radius between 11.5 and 22.5 microns and NA of 0.18 to 0.22; and a depressed index cladding region surrounding said core and comprising refractive index delta Δ3 and a minimum refractive index delta $\Delta 3_{MIN}$, and an outer cladding comprising refractive index Δ4, said outer cladding region surrounding said depressed index cladding region, said depressed index cladding region having a refractive index delta less than about −0.2% and a width of at least 1 micron, wherein $\Delta 1 > \Delta 4 > \Delta 3_{MIN}$, and wherein said fiber exhibits a microbend sensitivity of less than 0.6 and an overfilled bandwidth of at least 3 GHz-km at a wavelength of 850 nm and an overfilled bandwidth of at least 1.2 GHz-km at one or more wavelengths between 980 nm and 1060 nm.

9. The multimode fiber of claim 8, wherein $0.9\% \leq \Delta 1_{MAX} \leq 1.2\%$.

10. The multimode fiber of claim 8, wherein said fiber exhibits an overfilled bandwidth of at least 2 GHz-km at a wavelength of 910 nm, and an overfilled bandwidth of at least 1.2 GHz-km at one or more wavelengths between 980 nm and 1000 nm.

11. The multimode fiber of claim 8, wherein said core comprises a core radius between 15 and 22.5 microns.

12. The multimode fiber of claim 8, wherein said fiber exhibits an overfilled bandwidth greater than 2.5 GHz-km at a wavelength of 980 nm.

13. The multimode fiber of claim 8, wherein said fiber exhibits an overfilled bandwidth greater than 2 GHz-km at a wavelength of 1060 nm.

14. The multimode fiber according to claim 8, wherein said fiber exhibits a numerical aperture between 0.18 and 0.22.

15. A system comprising:
(i) at least light source transmitting at a bit rate of 25 Gb/s or higher at one or more wavelengths between 900 and 1200 nm;
(ii) at least one multimode optical fiber optically coupled to said light source, said fiber comprises a graded index a graded index glass core having an alpha between 2.05 and 2.15, a core radius between 11.5 and 22.5 microns, a maximum refractive index delta $0.75\% \leq \Delta 1_{MAX} \leq 1.2\%$ and NA of 0.18 to 0.22, and a cladding comprising an outer cladding portion, wherein said fiber has exhibits an overfilled bandwidth at a wavelength of 850 nm of at least 3 GHz-km, an overfilled bandwidth of at least 1.2 GHz-km at one or more wavelengths between 980 and 1060 nm; and
(iii) a detector optically coupled to said multimode optical fiber and capable of detecting a wavelength in 900 nm to 1200 nm.

16. The system according to claim 15, wherein: said fiber exhibits:
(a) a chromatic dispersion magnitude less than 100 ps/nm/km at 850 nm, less than 60 ps/nm/km at least one wavelength situated in 900 nm to 1060 nm range; and
(b) an attenuation less than 1.5 dB/km at one or more wavelengths situated in 900 nm to 1060 nm range.

17. The system according to claim 15, wherein:
a. said at least one light source is at least one VCSEL;
b. said cladding comprises an inner cladding surrounding and in contact with the core, a depressed-index annular portion surrounding the inner cladding portion, said depressed-index annular portion having a refractive index delta $\Delta 3_{MIN}$ less than about −0.2% and a width of at least 1 micron,
said core has a radius greater than 12 and the maximum refractive index delta between 0.8 and 1.1%.

18. The system according to claim 15, wherein said core comprises silica doped with Ge, and no other dopants in the amount greater than 1 wt %.

19. The system according to claim 15, wherein said fiber is a multimode optical fiber comprising:
a depressed index cladding region surrounding said core and comprising refractive index delta Δ3 and a minimum refractive index delta $\Delta 3_{MIN}$, and an outer cladding comprising refractive index Δ4, said outer cladding region surrounding said depressed index cladding region, said depressed index cladding region having a refractive index delta less than about −0.2% and a width of at least 1 micron, wherein $\Delta 1 > \Delta 4 > \Delta 3_{MIN}$, and wherein said fiber exhibits an overfilled bandwidth of at least 3 GHz-km at a wavelength of 850 nm and an overfilled bandwidth of at least 1.2 GHz-km at one or more wavelengths between 980 nm and 1060 nm.

* * * * *

UNITED STATES PATENT AND TRADEMARK OFFICE
CERTIFICATE OF CORRECTION

PATENT NO. : 10,107,957 B2
APPLICATION NO. : 15/119992
DATED : October 23, 2018
INVENTOR(S) : Scott Robertson Bickham et al.

Page 1 of 1

It is certified that error appears in the above-identified patent and that said Letters Patent is hereby corrected as shown below:

In the Specification

In Column 1, Line 11, delete "PCT/US2015316300" and insert -- PCT/US2015/16300 --, therefor.

In Column 1, Line 14, delete "which" and insert -- which is --, therefor.

In the Claims

In Column 23, Line 49, Claim 8, delete "0.6" and insert -- 0.6, --, therefor.

Signed and Sealed this
First Day of November, 2022

Katherine Kelly Vidal
*Director of the United States Patent and Trademark Office*